Figure 1:
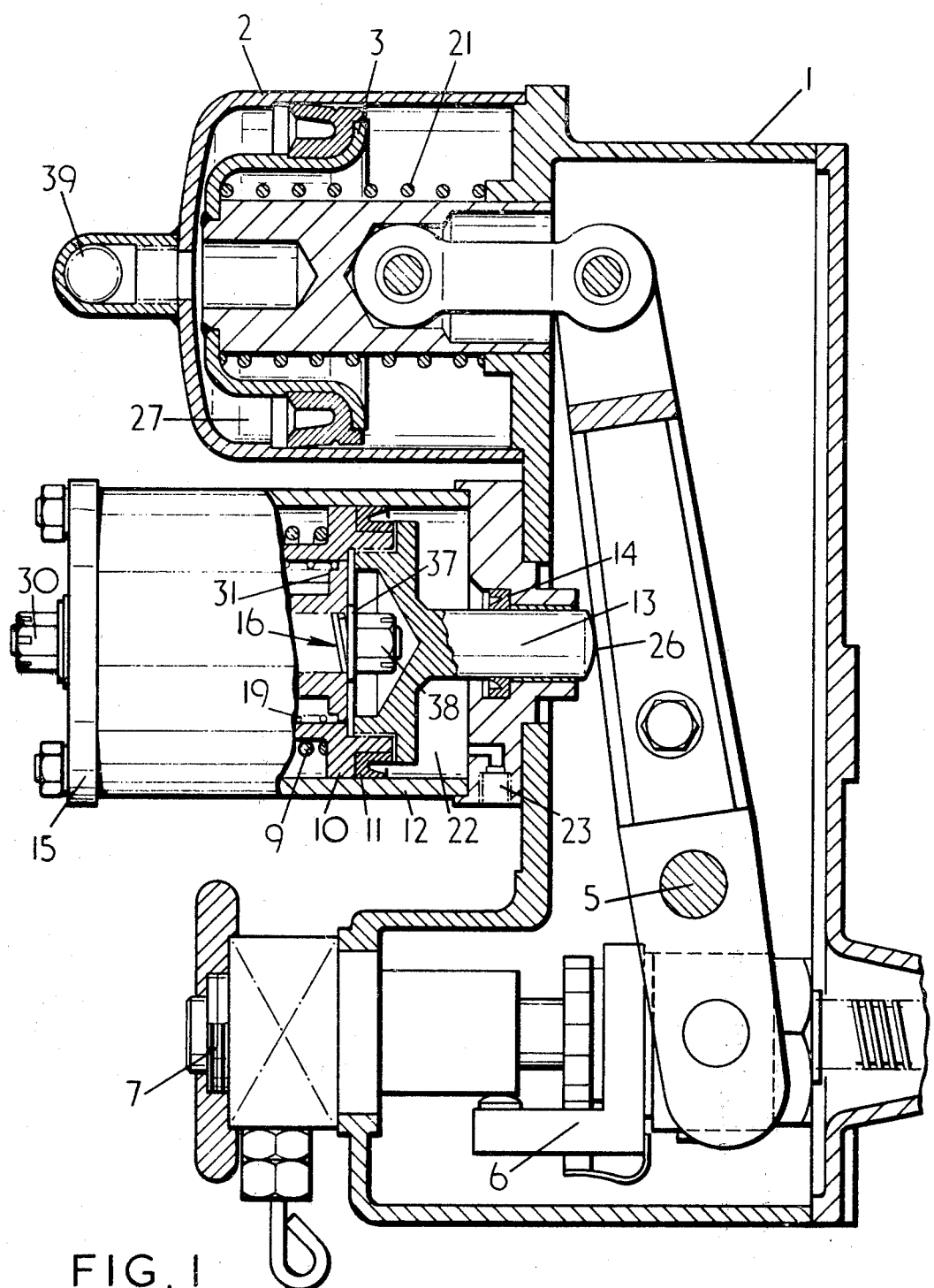

United States Patent [19]

Hunter

[11] 3,895,695

[45] July 22, 1975

[54] SPRING APPLIED FLUID RELEASED BRAKE UNIT

[75] Inventor: Ian Pearson Hunter, Glossop, England

[73] Assignee: Davies & Metcalfe Limited, North Stockport, England

[22] Filed: Feb. 25, 1974

[21] Appl. No.: 445,701

[30] Foreign Application Priority Data

Feb. 24, 1973 United Kingdom.................. 9161/73

[52] U.S. Cl........................ 188/170; 92/63; 92/130
[51] Int. Cl............................................ F16d 65/24
[58] Field of Search........... 188/170; 92/63, 64, 130

[56] References Cited
UNITED STATES PATENTS

| | | | |
|---|---|---|---|
| 3,462,986 | 8/1969 | Cox, Jr. et al. .......................... | 92/63 |
| 3,630,093 | 12/1971 | Morse et al. ..................... | 188/170 X |
| 3,782,251 | 1/1974 | Marchand.............................. | 92/63 |

*Primary Examiner*—George E. A. Halvosa
*Attorney, Agent, or Firm*—Sughrue, Rothwell, Mion, Zinn & Macpeak

[57] ABSTRACT

A spring brake unit for a pneumatically operated vehicle braking system. The unit comprises a cylinder with a piston which applies braking effort in a first or braking direction in response to the force of a spring on a first side of the piston when air pressure on the opposite or second side falls below a predetermined value such as due to leakage when the vehicle is parked. To enable the brake to be released other than by the application of air pressure to the second side of the piston, a nut is threaded on a non-axially movable screw, and a clutch member is mounted on the nut which cannot rotate relatively to the clutch member but can slide axially therethrough. When the screw is rotated in one sense, the nut is moved in the opposite or second direction axially along the screw from its normal working position so that the nut abuts the clutch which is frictionally in contact with a projection on the piston and so moves the piston in the second direction to release the brake. A torsion spring secured at opposite ends to the screw and nut is twisted and compressed by the relative movement therebetween. If the air pressure on the second side of the piston is now increased above the predetermined level, the piston is moved further in the second or brake release direction. This disengages the projection from the clutch which enables the nut, with the clutch therein, to be rotated back along the screw in the first direction to the normal working position by the untwisting and expanding action of the torsion spring.

13 Claims, 7 Drawing Figures

SPRING APPLIED FLUID RELEASED BRAKE UNIT

This present invention concerns a spring brake unit suitable for use for the prevention of rotation of a shaft or wheel by means of a conventional block, disc, band or shoe brake or alternatively in conjunction with a suitable control system for the retardation of the said shaft or wheel.

According to the invention the spring brake unit is provided with means by which a brake may be released either by fluid pressure or by manual operation, said means being arranged in such a manner that a manual release having been made the first subsequent release by fluid means will reset the manual release mechanism into its normal running condition if this has not been previously done by manual means.

According to another aspect of the invention there is provided a spring brake unit in combination with first piston and cylinder means actuated by fluid under pressure so as to cause operation of a brake, the spring brake unit comprising second piston and cylinder means for causing operation of the brake by relative movement of the second piston in a first direction under the action of first spring means in the event of fluid pressure dropping below a predetermined value, a member movable, by mechanical means in the opposite or second direction, from its normal working position, to cause relative movement of the second piston in the second direction for effecting release of the brake, second spring means tensionable by movement of the member in said second direction, and said member being returnable, in the first direction, to its normal working position under the force of the second spring means upon the fluid pressure being raised above the predetermined level.

The spring brake unit is for use normally in conjunction with a fluid pressure power brake system for the prevention of rotation of the shaft or wheel and will be applied automatically when the fluid pressure is not available for any reason.

Figure 2:
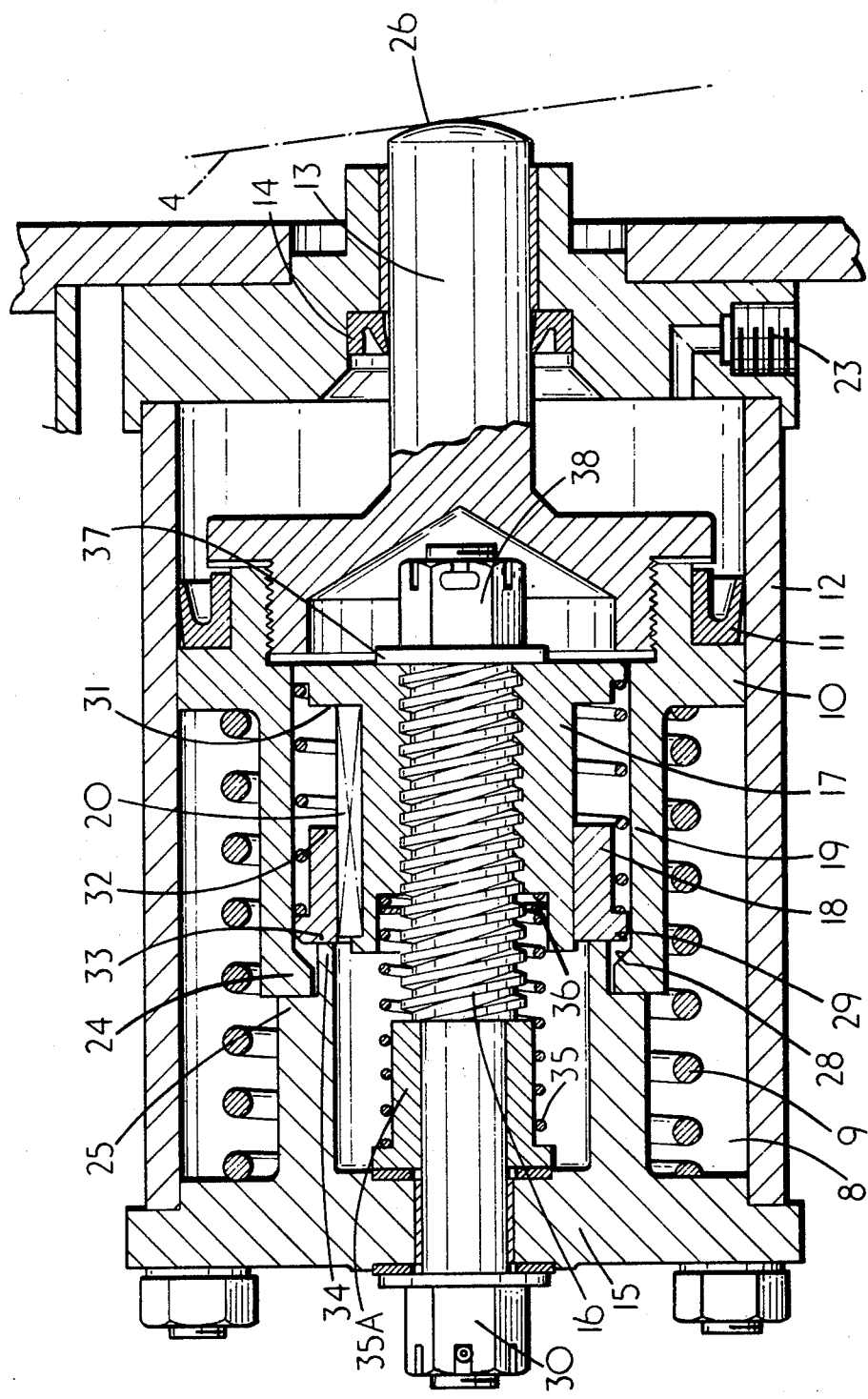
Figure 3:
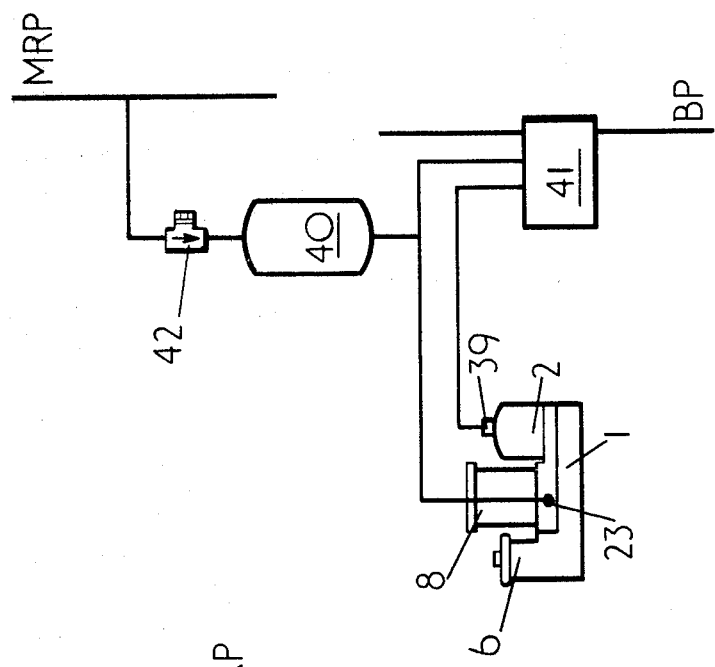
Figure 4:
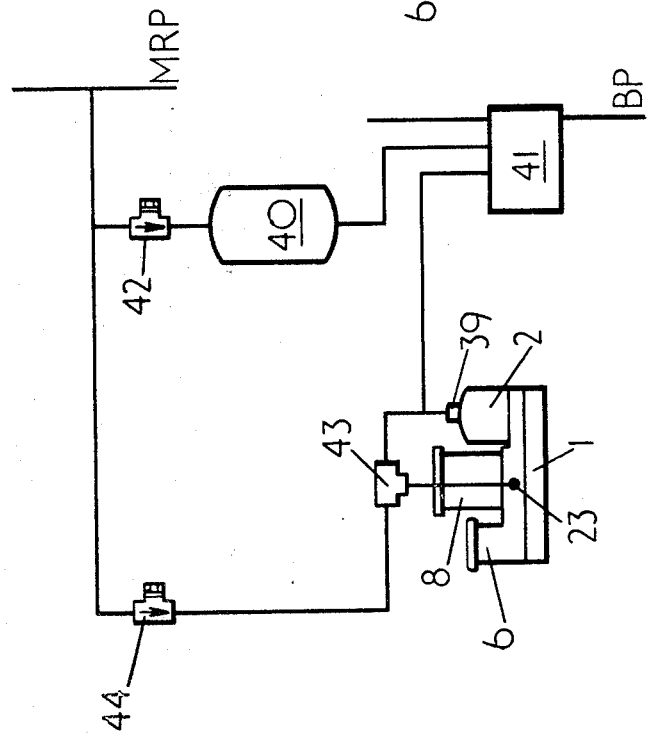
Figure 5:
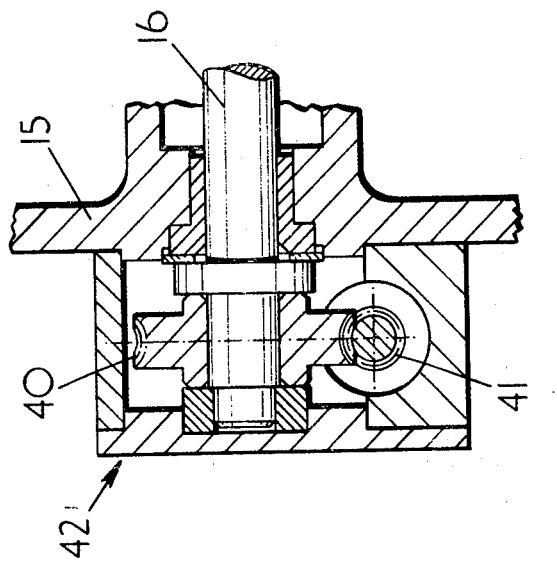
Figure 7:
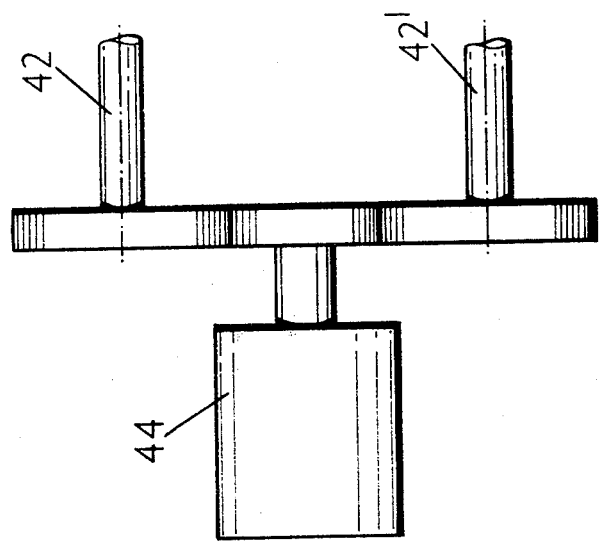
Figure 6:
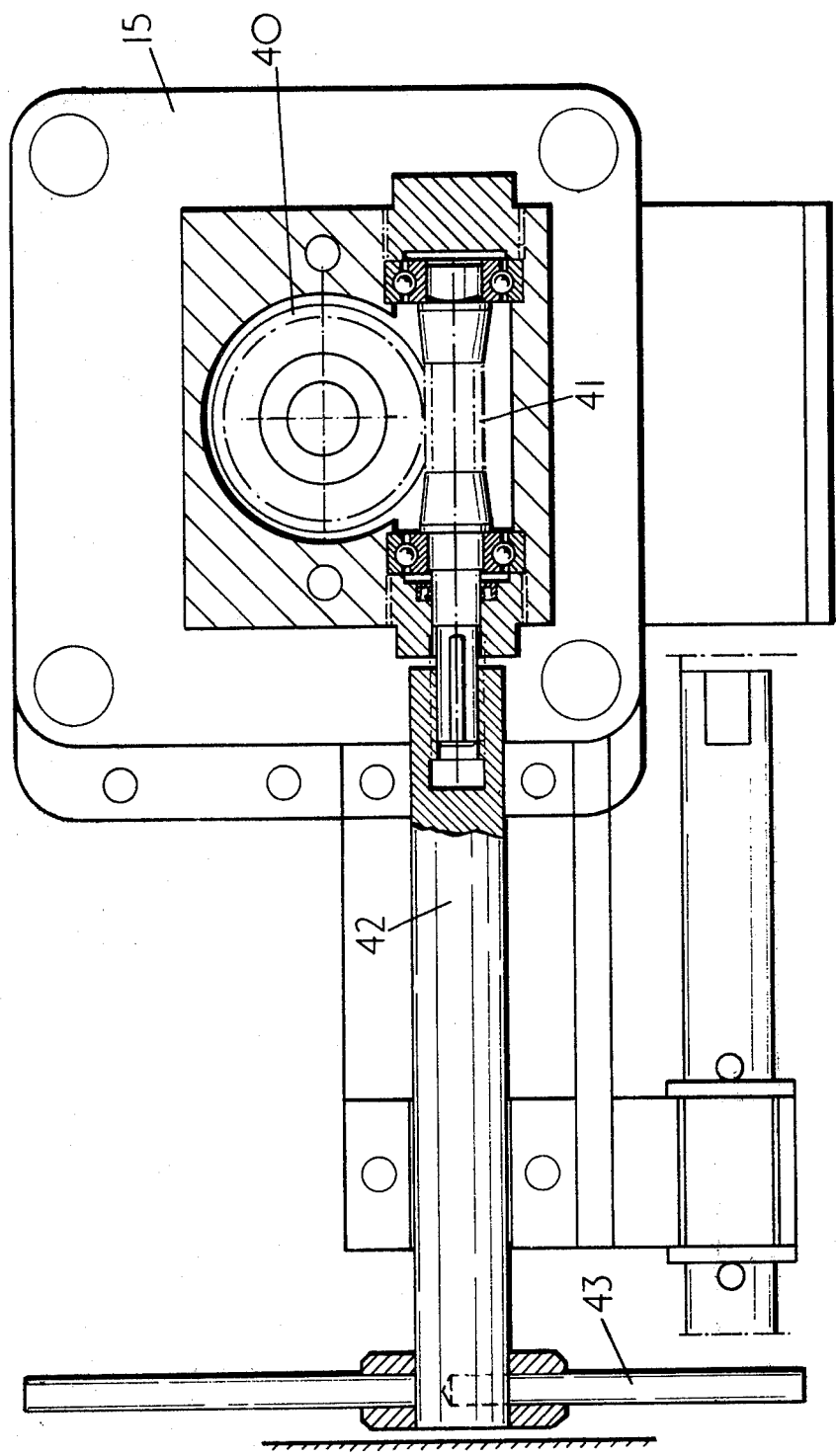

An application of the invention to a vehicle braking system in which compressed air is the operating fluid will now be described in detail with reference to the accompanying drawings in which like reference numerals refer to like parts. In the drawings:

FIG. 1 is a section of a fragment of a brake unit formed according to the invention, FIG. 2 is an enlarged fragment of a spring brake cylinder in FIG. 1, FIGS. 3 and 4 are diagrammatic layouts of fluid circuits for use in conjunction with the brake unit, FIG. 5 is a fragmentary view of gearing for rotating the screw in FIGS. 1 and 2, FIG. 6 is a diagram showing how the gearing in FIG. 5 may be rotated by hand, and FIG. 7 is a modification of the arrangement in FIG. 6 showing a motor for rotating the gearing.

FIG. 1 shows a typical combined brake cylinder and slack adjuster unit for the bogie of a railway vehicle to which a spring brake unit has been added. Referring to FIGS. 1 and 2, the combination comprises a body 1 on which is mounted a compressed air operated cylinder 2. A piston 3 of this cylinder acts upon one end of a lever 4 which is free to move about a fixed pivot 5 carried in the body 1. The other end of the lever 4 is pivotedly attached to a slack adjuster 6. Air pressure applied to the piston 3 of the cylinder 2 causes the piston to move the lever 4 and through it the slack adjuster 6 until spindle 7 actuates the brake by, for example, coming into contact with a brake shoe (not shown) and then pushing the latter on to a wheel. Since further movement of the system is now prevented the application of the air pressure to the piston 3 causes a corresponding force to be built up on the spindle 7 and thus on to the brake block and wheel. This operation is in accordance with conventional practice.

Mounted on the body 1 or formed integrally with it, is a spring brake cylinder 8 with a load spring 9 which may be either a single spring as shown or a nest of concentric springs according to the force which the spring brake unit is required to exert, and a piston 10 with a pressure sealing device 11 axially movable in cylinder 12. An extension 13 of the piston 10 passes through a pressure tight seal 14 in the body and is arranged to act upon lever 4. The cylinder 12 is fitted with a cover 15 in which is carried a screw 16 having a plain cylindrical portion which is free to move rotationally but not axially in the cover. The screw 16 is provided with a nut unit 17 on an outer face of which is mounted a tubular clutch 18 which is free to move axially along the nut unit 17 under the tension of spring 19, but is prevented from rotating relative to the nut by suitable means, in this example a key 20.

FIG. 1 shows the device in the normal running condition when both the spring and air brakes are released. The operation of the unit may be described conveniently by reference to the various conditions under which it is required to operate.

In the "running" condition the brake system is charged fully and no air is admitted to the air brake cylinder so that the piston 3 is maintained in its released position by spring 21. Compressed air from an auxiliary reservoir is however admitted to chamber 22 of the spring brake cylinder 8 through connection 23. When the air pressure in this chamber 22 has built up sufficiently for the force exerted on the piston 10 to overcome the tension in the load spring(s) 9 the piston moves to the left compressing the load spring(s) 9 until a tubular extension 24 of the piston comes into contact with a tubular stop 25 formed on the cover 15. A segmental spherical end 26 of the piston rod 13 forms a stop for the lever 4 thus preventing the piston 3 from striking the end of the air brake cylinder 2.

In all pneumatic "braking" conditions the chamber 22 of the spring brake cylinder 8 remains charged with air so that the piston 10 remains in the normal running position. Air is however admitted to chamber 27 of the air brake cylinder 2 via connection passage 39 causing the piston 3 and the top end of lever 4 to move to the right. The bottom end of lever 4 and slack adjuster 6 move correspondingly to the left about the fulcrum 5 to apply the brakes in the normal manner. The spherical end 26 of the spring brake unit piston rod 13 is now no longer in contact with lever 4.

When the air brakes are released the air brake cylinder piston 3 returns to the running position previously described under the action of spring 21.

If the vehicle is parked with the air brake applied for an extended period the air pressure in the system will fall due to normal leakage, or, alternatively, the compressed air in the system may be vented direct to atmosphere for maintenance purposes. The pressure in the chamber 22 of the spring brake unit 8 will then fall. When it is reduced to a predetermined value the tension in the load spring(s) 9 exerted on the piston 10 will overcome the force exerted by the air pressure on the other side of the piston which will then move to the right causing the piston rod 13 the segmental spherical end 26 of which is in contact with lever 4 to move the said lever to the right. The slack adjuster 6 moves correspondingly to the left to apply the brakes. As the piston 10 moves to the right a frusto-conical face 28 on the piston extension 24 comes into contact with a frusto-conical face 29 of the clutch 18, further movement of the piston 10 causing the clutch 18 to slide axially along the nut unit 17 against the tension of the spring 18 which keeps the frusto-conical faces 28 and 29 in contact with each other. When the spindle 7 of the slack adjuster 6 has brought the brake block, for example, into contact with the wheel no further movement of the piston 10 takes place. The load transmitted by the segmental spherical end 26 of the piston rod 13 on to the lever 4 and thence on to the brake block then starts to build up and increases progressively as the pressure in chamber 22 falls so that the full designed spring load is not applied until the pressure in the said chamber falls to zero.

When the brake system is re-charged subsequently, the pressure in the chamber 22 of the spring brake unit will be built up above the predetermined value so that the piston 10 then moves to the left to take up the running position as previously described.

If it is necessary to move a vehicle parked with the spring brakes applied without re-charging the air brake system, the brakes have to be released manually. A nut 30 which is secured to the screw 16 is turned with a suitable spanner so that the screw 16 rotates inside the nut unit 17 which is prevented from rotating by frictional engagement between the frusto-conical faces 28 and 29 of the piston extension 24 and the clutch 18 respectively which are kept in engagement by the tension in the spring 19. The nut unit 17 moves axially to the left along the thread of the screw 16 sliding through the clutch 18 which is restrained from moving by the conical face 28 of the piston extension 24 and at the same time compressing the spring 19 until shoulder 31 of the nut unit comes into contact with face 32 of the clutch. Further movement of the nut unit 17 along the screw 16 causes the piston 10 to move to the left compressing the load spring(s) 9 whilst at the same time the force exerted by the air brake cylinder release spring 21 on the piston 3 causes the lever 4 to move to the left so that it maintains contact with the spherical end 26 of the piston rod 13. The bottom end of lever 4 rotating about fixed fulcrum 5 moves correspondingly to the right together with slack adjuster 6 thus releasing the brakes. The nut unit continues to move to the left upon further rotation of the screw 16 which causes further compression and twisting of torsion spring 35 secured at one end to sleeve 35A, rotatable with the screw, and at the other to an end of face 36 in the unit 17, until the face 33 of the clutch 18 comes into contact with projection 34 formed on the cover 15 thus preventing any further movement. The normal working clearance between the brake block and the wheel has now been restored.

After the vehicle has been moved the spring brake may be re-applied manually if required by turning the nut 30 with a spanner in the reverse direction.

When the spring brake has been released manually as described above and the air brake system is recharged subsequently without the spring brake being re-applied, compressed air is admitted through connection 23 to chamber 22. When the pressure exerted on the piston 10 has built up to the prescribed value, the piston 10 moves further to the left until its extension 24 comes into contact with the stop 25 formed on the cover 15. Since further movement of the clutch 18 is prevented by stop 34 on the cover 15 the frusto-conical faces 28 and 29 of the piston extension 24 and the clutch 18 respectively separate. Clutch 18 now being released, the nut unit 17 then rotates round the screw 16 under the untwisting couple exerted by the spring 35 on the nut unit. The nut unit 17 continues to rotate until it reaches the end of the thread on screw 16 and comes into contact with a retaining washer 37 secured to the end of the screw 16 by a nut 38. The spring brake unit has now re-set itself automatically into its normal running condition so that, in the event of loss in air pressure in chamber 22, it will operate automatically to apply the brakes as previously described. This device ensures that in the event of a vehicle being put into service with the spring brakes left accidentally in the manually released condition, they will still operate correctly as soon as the compressed air system is re-charged under normal running conditions.

FIG. 3 shows a typical pneumatic system in which the supply of compressed air for the spring brake unit 8 is taken from an auxiliary reservoir 40 which may be charged either through a conventional distributor, or brake unit 41, or direct through a check valve 42 from another source of compressed air such as a known main reservoir pipe MRP so that the minimum pressure necessary to release the spring brake may be higher than the maximum brake cylinder pressure. The brake unit 41 is connected in conventional manner to a brake pipe BP.

FIG. 4 shows an alternative pneumatic system in which the supply of compressed air for the spring brake unit is taken from either one of two main sources depending upon the maximum pressure available at any given time. Under normal running conditions the spring brake unit 8 is connected through pipe connection 23, double check valve 43 and check valve 44 to either the main reservoir supply or to the auxiliary reservoir using a similar arrangement to that shown in FIG. 3. The other branch of the double check valve 43 is connected direct to the connection 39 on the air brake cylinder 2. With this arrangement the minimum pressure necessary to release the spring brake and render it inoperative is less than or equal to the maximum air brake cylinder pressure. If, when an air brake application has been made, the normal pressure of air supplied to the spring brake unit 8 from the main or auxiliary reservoir falls, due to leakage or some other cause, below that obtaining in the air brake cylinder 2, the double check valve 43 will change over to connect the spring brake unit direct to the air brake cylinder. This ensures that there is no combination of circumstances which could arise under normal running conditions under which the spring brake and the air brakes could both be applied fully at the same time which could cause overbraking and, consequently, the wheels to slide on the track.

In the example of this invention described in detail, the fluid means employed to release the brake is compressed air but it should be understood that an hydraulic system may be used as an alternative. Furthermore, the unit can be arranged with both compressed air and hydraulic pistons so that either means can be employed to release the spring brake to suit the operating requirements at any given time.

Should acess to the nut 30 be difficult, the screw 16 may be provided with a worm wheel 40 (as shown in FIG. 5) driven by a worm 41 both contained in a housing 42 on the cover 15. Rotation of the worm 41 causes rotation of the screw 16 to release or apply the brake as described when the vehicle is parked.

As shown in FIG. 6 the worm 41 can be affixedly mounted on a shaft 42 which can be manually rotated by a hand wheel 43. Or as shown in FIG. 7 the shaft 42 can be rotated by a motor 44 for example a reversible electric motor. Therefore, by setting the motor 44 in operation the screw 16 can be rotated in one direction or the other by remote control to release or re-apply the spring brake. The motor 44 can also be arranged to simultaneously rotate other shafts for example shaft 42' which acts on another spring brake unit to release and re-apply the latter in the same manner as described above.

What is claimed is:

1. A spring brake unit in combination with first piston and cylinder means actuable by fluid pressure for causing operation of a brake, the spring brake comprising: second piston and cylinder means, the second piston being relatively movable in first and second opposite directions for causing brake application and brake release respectively, first spring means continually urging the second piston in said first direction but movement in said first direction being prevented by fluid pressure urging said piston in said second direction, until the fluid pressure falls below a predetermined value, a screw disposed in said second piston and cylinder means, said screw being mounted for inhibiting axial movement thereof in said first and second directions relative to the second piston and cylinder means, a nut threaded on said screw for rotation thereabout, said nut and second piston being arranged for engagement whereby relative rotary movement between the two is prevented when the second piston is moved in said first direction relative to a normal working position of the nut on the screw in the event of fluid pressure falling below said predetermined value, the engagement between the nut and second piston being arranged for the nut to move the second piston in the second direction when the nut is advanced in that direction from its normal working position by rotation of the screw, second spring means stressable by the movement of the nut in the second direction, stop means for abutment by the nut for preventing the latter moving the second piston in the second direction beyond a predetermined position, the second piston being movable in the second direction beyond the predetermined position for interrupting said engagement when fluid pressure above said predetermined value is applied to the second piston, whereby movement of the nut in the direction to its normal working position is effected by rotation of the nut relative to the second piston and the screw in response to force of the second spring means applied to the nut and in the event of said fluid pressure remaining below said predetermined value, the nut in engagement with the second piston being returnable in the first direction to the normal working position of the nut be rotation of the nut along the screw, whereby the second piston under the influence of the first spring means is permitted to move in the first direction.

2. The combination claimed in claim 1 in which the second spring means comprises at least one torsion spring one end of which is secured to the nut and the other end is rotatable by rotation of the screw whereby the spring is twisted by said rotation.

3. The combination claimed in claim 2 in which the torsion spring surrounds the screw.

4. A fluid actuated braking system as claimed in claim 1 in which the fluid under pressure is supplied to the first piston and cylinder means from a first source and the fluid at a higher pressure is normally supplied to the second piston and cylinder means from a second source and value means operable by a difference in pressure between the fluid under pressure from the first and second sources whereby the second piston and cylinder means is placed in communication with the first piston and cylinder means, in the event of the pressure of the fluid supplied from the second source falling below the pressure of the fluid supplied to the first source, for equalizing the pressure of the said fluid in the first and second piston and cylinder means.

5. The combination claimed in claim 1 in which a clutch member is axially slidably mounted on the nut but is nonrotatable relative thereto, third spring means acts to normally urge the clutch member in the second direction away from an abutment face on the nut arranged to abut the clutch member when the nut is moved in the second direction by the screw, and said clutch member has a friction surface urged into engagement with a friction surface on the second piston by the third spring means to prevent rotation of the nut when the latter is in its normal working position and the pressure in the second piston and cylinder means is below the predetermined level.

6. The combination claimed in claim 5 in which the nut is disposed in a tubular projection extending in the second direction from the second piston, the nut has a tubular portion extending in the second direction from a shoulder of the nut providing said abutment face, the clutch member is a tubular clutch member surrounding said nut, the third spring means is at least one compression spring braced between the clutch member and the shoulder to urge the clutch member away from said abutment face when the nut is in its normal working position, the clutch member has its friction surface at an end of the clutch member remote from the shoulder, the friction surface on the piston is disposed within said tubular projection, and the abutment means is arranged for abutment by said end of the clutch member.

7. The combination claimed in claim 1 in which fluid under pressure is admissible to a portion of the second cylinder on one or a first side of the second piston and the nut, screw, clutch member and second means are disposed to the opposite or second side of the second piston.

8. The combination as claimed in claim 1 in which the first piston means is arranged to transmit brake applying and brake releasing motion to a pivoted lever to which the second piston is also arranged to transmit brake releasing motion.

9. The combination claimed in claim 1 in which the screw is rotatable by a tool applied to the screw externally of the second piston and cylinder means.

10. The combination claimed in claim 1 in which the screw is rotatable by rotation of gearing.

11. The combination claimed in claim 10 in which the gearing is manually rotatable.

12. The combination claimed in claim 10 in which the gearing is rotatable by motor means.

13. The combination of claim 10 in which the gearing comprises a worm and worm wheel.

* * * * *